(12) United States Patent
Liu (10) Patent No.: US 10,039,324 B2
(45) Date of Patent: Aug. 7, 2018

(54) ELECTRONIC CIGARETTE (71) Applicant: Tuanfang Liu, Ji'an (CN)

(72) Inventor: Tuanfang Liu, Ji'an (CN)

(*) Notice: Subject to any disclaimer, the term of this patent is extended or adjusted under 35 U.S.C. 154(b) by 295 days.

(21) Appl. No.: 15/073,605

(22) Filed: Mar. 17, 2016

(65) Prior Publication Data
US 2017/0042228 A1  Feb. 16, 2017

(30) Foreign Application Priority Data

Aug. 14, 2015 (CN) .......................... 2015 1 0499389
Aug. 14, 2015 (CN) ....................... 2015 2 0612876 U (51) Int. Cl.
*A24F 47/00* (2006.01)
*F16J 15/02* (2006.01)
*H02J 7/00* (2006.01)

(52) U.S. Cl.
CPC ........... *A24F 47/008* (2013.01); *F16J 15/022* (2013.01); *H02J 7/0042* (2013.01); *H02J 7/0052* (2013.01); *H02J 2007/0062* (2013.01)

(58) Field of Classification Search
CPC ....... H02J 7/0042; H02J 7/0052; F16J 15/022
See application file for complete search history.

(56) References Cited

U.S. PATENT DOCUMENTS

2016/0366947 A1* 12/2016 Monsees ................. H05B 3/04
2017/0325507 A1* 11/2017 Xiang ................... A24F 47/008
2017/0347714 A1* 12/2017 Metz ..................... A24F 47/008

* cited by examiner

*Primary Examiner* — Linda L Gray
(74) *Attorney, Agent, or Firm* — Matthias Scholl, PC; Matthias Scholl (57) ABSTRACT

An electronic cigarette, including: an atomizer assembly, a battery assembly, and a charger assembly. The atomizer assembly includes: a temperature sensing wire, a first steel tube configured to receive the temperature sensing wire, and a temperature sensing base. The battery assembly includes an adjustment wheel. The charger assembly includes two elastic contact pins. The atomizer assembly is in threaded connection with the battery assembly. The battery assembly is disposed on the charger assembly. The charger assembly is electrically connected to the battery assembly via the two elastic contact pins so as to charge the battery assembly. The temperature sensing wire transmits temperature parameters to the battery assembly, and a power output is adjusted by the adjustment wheel thereby realizing temperature control.

5 Claims, 6 Drawing Sheets

ELECTRONIC CIGARETTE

CROSS-REFERENCE TO RELATED APPLICATIONS

Pursuant to 35 U.S.C. § 119 and the Paris Convention Treaty, this application claims the benefit of Chinese Patent Application No. 201510499389.3 filed Aug. 14, 2015, and Chinese Patent Application No. 201520612876.1 filed Aug. 14, 2015, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a smoking apparatus, more particularly to an electronic cigarette.

Description of the Related Art

Recently, electronic cigarette has been developing fast and is becoming more and more popular. A typical atomizer of the electronic cigarette adopts the battery for power supply. However, the battery only has single function, such as constant voltage maintenance, voltage regulation, or power regulation, but fails to control the temperature and recognize the resistance of the heating wire, which often leads to over-heated atomizer and too high the temperature of the smoke. Thus, the conventional electronic cigarette can no longer meet the requirements of the smokers, and the application thereof is limited.

SUMMARY OF THE INVENTION

In view of the above-described problems, it is one objective of the invention to provide an electronic cigarette which is convenient and easy to use.

To achieve the above objective, in accordance with one embodiment of the invention, there is provided an electronic cigarette. The electronic cigarette comprises: an atomizer assembly, a battery assembly, and a charger assembly. The atomizer assembly comprises: a temperature sensing wire, a first steel tube configured to receive the temperature sensing wire, and a temperature sensing base. The battery assembly comprises an adjustment wheel. The charger assembly comprises two elastic contact pins. The atomizer assembly is in threaded connection with the battery assembly. The battery assembly is disposed on the charger assembly. The charger assembly is electrically connected to the battery assembly via the two elastic contact pins so as to charge the battery assembly. The temperature sensing wire transmits temperature parameters to the battery assembly, and a power output is adjusted by the adjustment wheel thereby realizing temperature control.

In a class of this embodiment, the atomizer assembly comprises: a mouthpiece cap, a mouthpiece, a first sealing ring of mouthpiece, a mouthpiece converter, a second sealing ring on the mouthpiece converter, a third sealing ring inside the converter, a fourth sealing ring outside the converter, a steel mesh, a limit cover of heating wire, a fifth sealing ring of limit cover of heating wire, a piece of oil-storage cotton, a first cotton sheet, a first fixing ring of heating wire, a second cotton sheet, a heating wire, the temperature sensing wire, the first steel tube, a first insulating ring of heating wire, a heating wire connector, the temperature sensing base, two contact pins, a sixth sealing ring outside the converter, a second fixing ring of heating wire, a seventh sealing ring of threaded ring, a threaded connecting ring, an eighth sealing ring of flow, a flow adjustment ring, a first threaded ring, a second insulating ring, an adjustment ring, a first spring, a ninth sealing ring of shaft sleeve, a pin, a tenth sealing ring of adjustment ring, an oiling base, an eleventh sealing ring of glass tube, a windowed tube, an eleventh sealing ring of glass tube, and a third fixing ring of glass tube, a sealing ring clasp, a twelfth sealing ring of atomizing rod, a shaft sleeve, a glass tube. The steel mesh, the fifth sealing ring, the heating wire, and the temperature sensing wire are disposed inside the first fixing ring. The first steel tube is inserted in the temperature sensing base for fixation. Two contact pins are inserted into two holes on the temperature sensing base to fix two ends of the temperature sensing wire, respectively. The heating wire connector is integrated with the temperature sensing base, and the first insulating ring is mounted on the heating wire connector and embedded into an inner hole of the first fixing ring. The heating wire is sheathed with the first cotton sheet and the second cotton sheet from the inside out and then disposed inside the first fixing ring, wherein a thickness of the first cotton sheet is larger than a thickness of the second cotton sheet. The first fixing ring is sheathed with the oil-storage cotton, and is then disposed inside the limit cover of heating wire. The limit cover of heating wire is in threaded connection with the second fixing ring.

In a class of this embodiment, the battery assembly comprises: a battery cover, a lower cover, a third insulating ring of charging contact pin, a charging contact pin, a second steel tube configured to receive the battery, a battery, a spring shaft, a torsion spring, a charging column carrier, fourth insulating rings, charger springs, charging contact pin bases, a charging elastic contact pins, a square electrode, an electrode insulating cap, a contact pin of anode, a contact pin spring, an adjustment rod carrier, an insulating spacer, a cathode circle of threaded ring, a second threaded ring, an output insulating ring, an output connector, an encoder, an adjustment rod, a thirteenth sealing ring beneath the adjustment wheel, the adjustment wheel, a fourteenth sealing ring above the adjustment wheel, an upper cover, a main body shell, and a PCB board. One end of the second steel tube is integrated with the anode base. The square electrode, the electrode insulating cap, the contact pin, and the contact pin spring are disposed on the anode base. The other end of the second steel tube is disposed in the main body shell. The upper cover on a top of the main body shell is provided with the cathode circle of threaded ring, the second threaded ring, the output insulating ring, and the output connector in sequence. A bottom of the main body shell is provided with the lower cover, the battery cover, and the charging column carrier. The torsion spring is integrated with the torsion spring shaft and the battery cover, so that the battery cover is rotatable around the torsion spring shaft and slidable along the main body shell. One side of the main body shell is provided with the PCB board, the button reinforcing ring, the button fixing base, the button rubber, the button, the decorative ring, the decorative sheet, an LCD screen, and a screen carrier.

In a class of this embodiment, the charger assembly comprises: a charger support, a screw, a bottom cover, a USB charging jack, a charger, two fourth insulating rings of contact pin base, two charger springs, two charging contact pin bases, and two charging elastic contact pins.

In a class of this embodiment, the charger is provided with the fourth insulating rings, the charging elastic contact pins, the charging contact pin bases, and the charger springs. The charging elastic contact pins are integrated with the charging contact pin bases and the charger springs to form two groups of members which are disposed in the charger and are used as charging anode and cathode. In addition, a bottom of the charger is provided with the USB charging jack to supply electricity. The bottom cover is provided with the charger support to realize slip resistance.

Advantages of the electronic cigarette according to embodiments of the invention are summarized as follows:

1. The temperature sensing wire is disposed in the heating wire, so that the temperature parameter of the heating wire is detected and transmitted to the battery assembly. An adjustment button in the battery assembly adjusts the power output, so that the temperature control is realized.

2. The integral structure of the cigarette is adapted to adjust the temperature of the atomizer.

BRIEF DESCRIPTION OF THE DRAWINGS

The invention is described hereinbelow with reference to the accompanying drawings, so that the above advantages of the invention are clear, in the drawings.

DETAILED DESCRIPTION OF THE EMBODIMENTS

For further illustrating the invention, experiments detailing a temperature controllable electronic cigarette are described below. It should be noted that the following examples are intended to describe and not to limit the invention.

Figure 1:
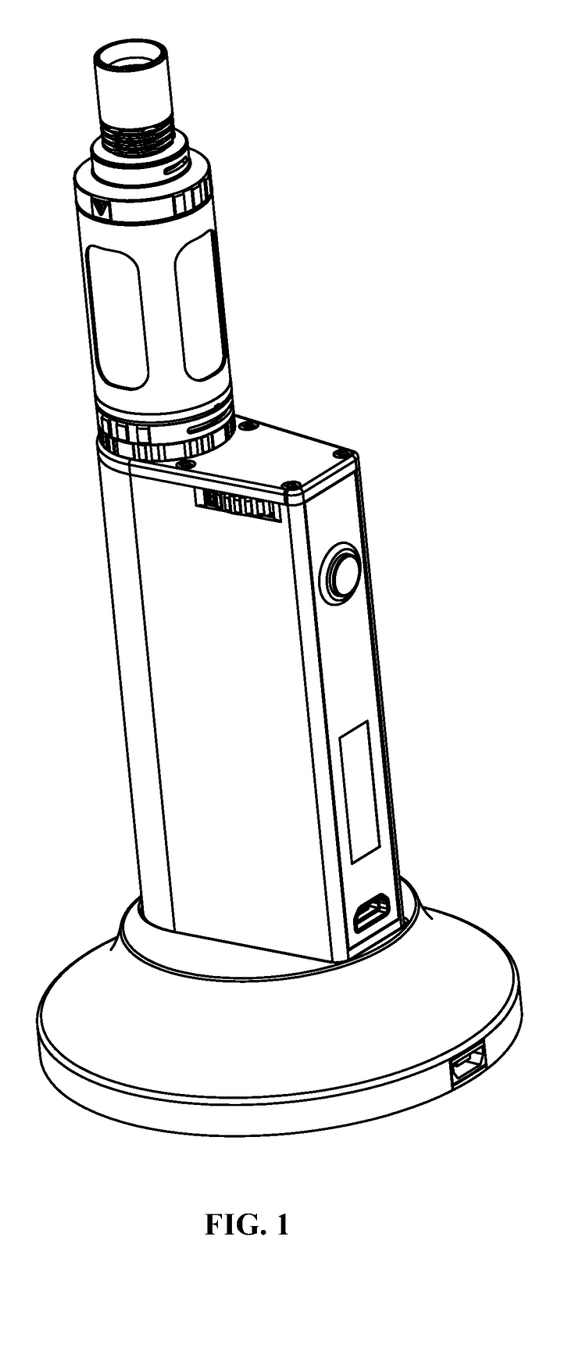
FIG. 1 is a stereogram of an electronic cigarette in accordance with one embodiment of the invention.
Figure 2:
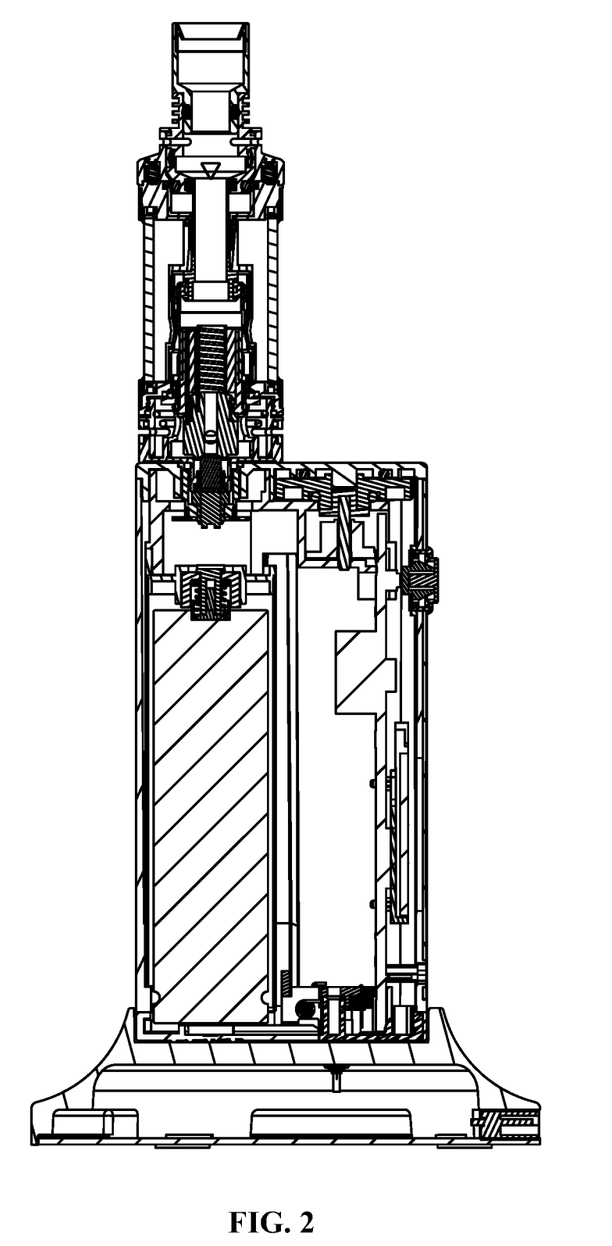
FIG. 2 is a cross-sectional view of an electronic cigarette in accordance with one embodiment of the invention.
Figure 3:
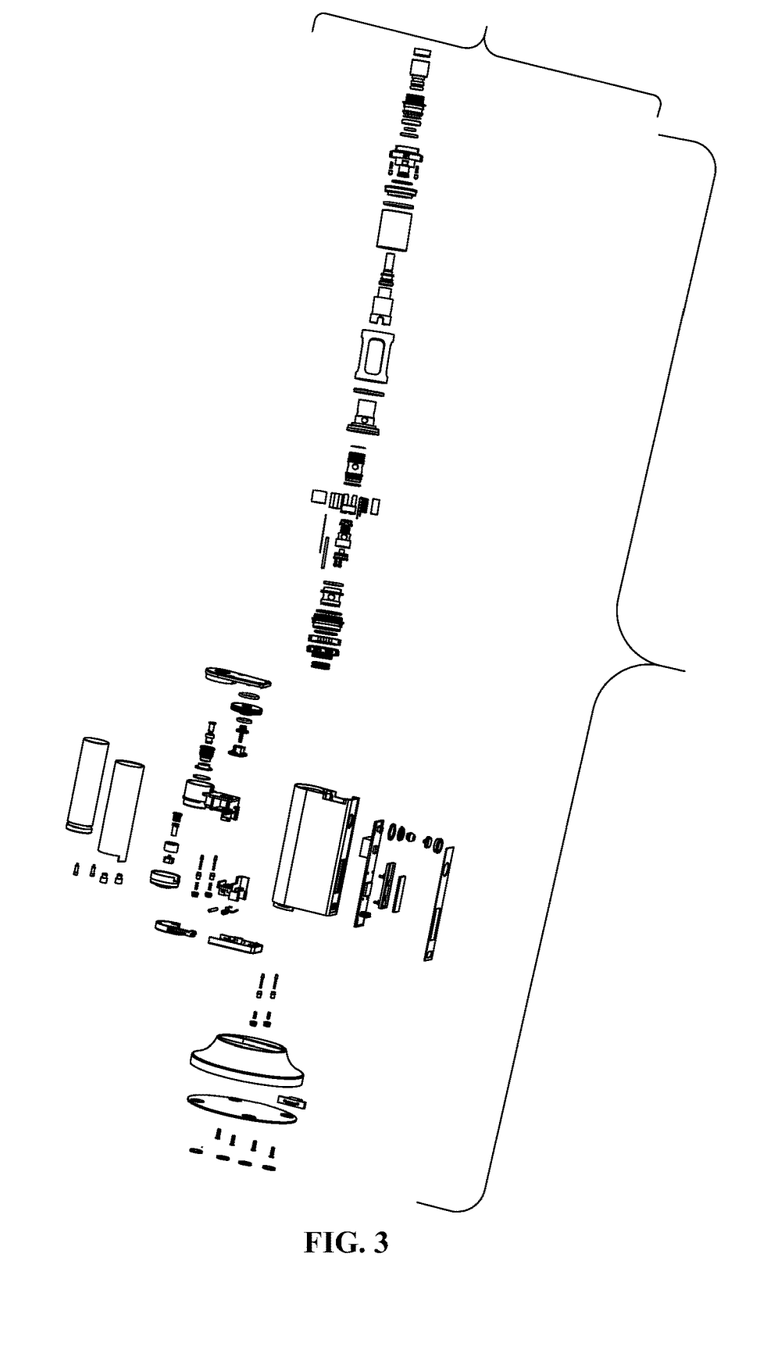
FIG. 3 is an exploded view of an electronic cigarette in accordance with one embodiment of the invention.

A temperature controllable electronic cigarette comprises: an atomizer assembly A, a battery assembly B, and a charger assembly C. The atomizer assembly A is in threaded connection with the battery assembly B. The battery assembly B is disposed on the charger assembly C. The charger assembly C comprises two elastic contact pins, and the charger assembly C is electrically connected to the battery assembly B via the two elastic contact pins so as to charge the battery assembly B. The atomizer assembly A comprises a temperature sensing wire 72, a first steel tube 71 configured to receive the temperature sensing wire, and a temperature sensing base 68. The atomizer assembly A is in threaded connection with the battery assembly B. The temperature sensing wire 72 transmits temperature parameters to the battery assembly B, and a power output is adjusted by an adjustment wheel 33 of the battery assembly B thereby realizing temperature control.

Figure 4A:
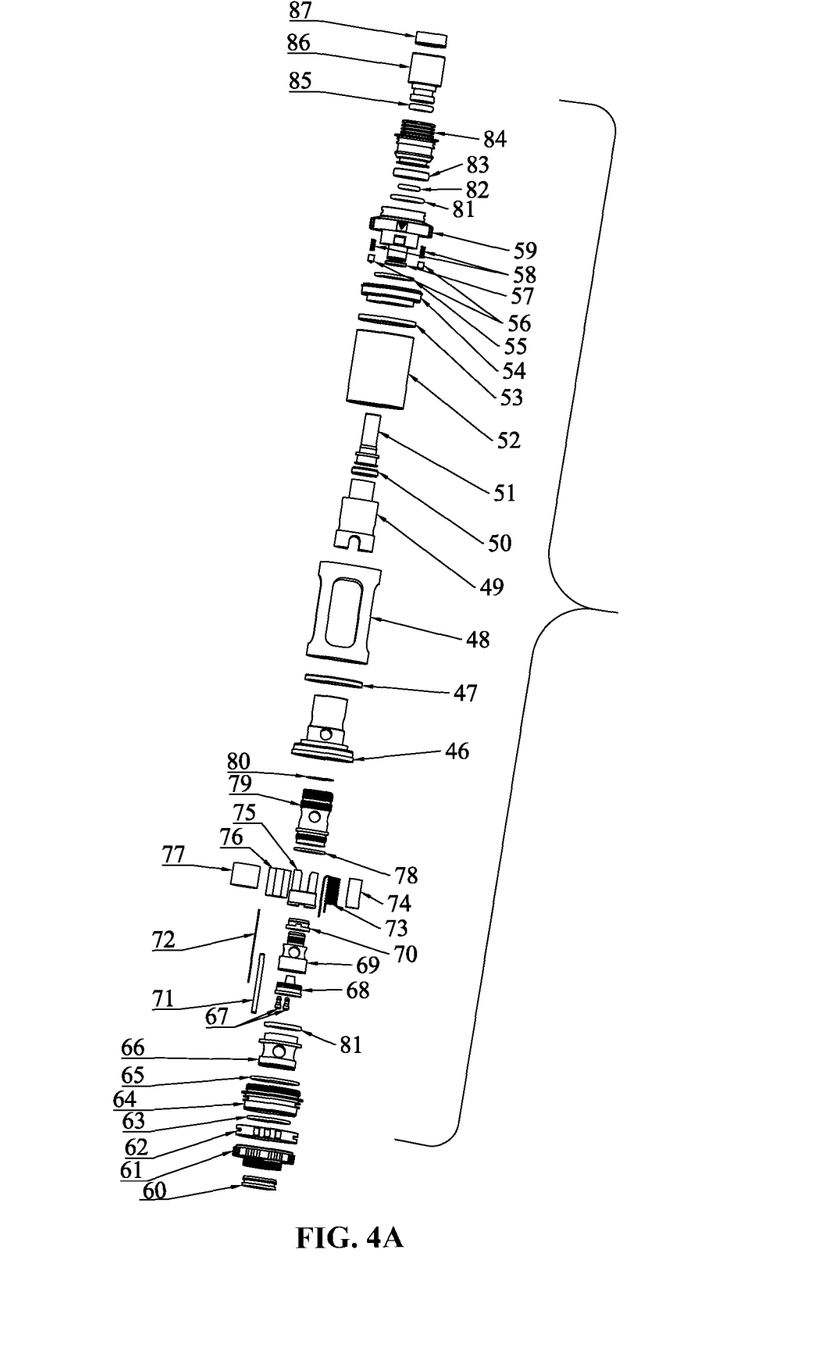
FIG. 4A is an exploded view of an atomizer assembly A of an electronic cigarette in accordance with one embodiment of the invention.

Preferably, the atomizer assembly A comprises: a mouthpiece cap 87, a mouthpiece 86, a first sealing ring of mouthpiece 85, a mouthpiece converter 84, a second sealing ring 83 on the mouthpiece converter, a third sealing ring 82 inside the converter, a fourth sealing ring 81 outside the converter, a steel mesh 80, a limit cover 79 of heating wire, a fifth sealing ring 78 of limit cover of heating wire, a piece of oil-storage cotton 77, a first cotton sheet 76 which is environmentally friendly and organic, a first fixing ring 75 of heating wire, a second cotton sheet 74 which is environmentally friendly and organic, a heating wire 73, the temperature sensing wire 72, the first steel tube 71, a first insulating ring 70 of heating wire, a heating wire connector 69, the temperature sensing base 68, two contact pins 67, a sixth sealing ring outside the converter, a second fixing ring 66 of heating wire, a seventh sealing ring 65 of threaded ring, a threaded connecting ring 64, an eighth sealing ring 63 of flow, a flow adjustment ring 62, a first threaded ring 61, a second insulating ring 60, an adjustment ring 59, a first spring 58, a ninth sealing ring 57 of shaft sleeve, a pin 56, a tenth sealing ring 55 of adjustment ring, an oiling base 54, an eleventh sealing ring 53 of glass tube, a glass tube 52, a sealing ring clasp 51, a twelfth sealing ring 50 of atomizing rod, a shaft sleeve 49, a windowed tube 48, an eleventh sealing 47 ring of glass tube, and a third fixing ring 46 of glass tube. The steel mesh 80, the fifth sealing ring 78, the heating wire 73, and the temperature sensing wire 72 are disposed inside the first fixing ring 75. The first steel tube 71 is inserted in the temperature sensing base 68 for fixation. Two contact pins 67 are inserted into two holes on the temperature sensing base 68 to fix two ends of the temperature sensing wire 72, respectively. The heating wire connector 69 is integrated with the temperature sensing base 68, and the first insulating ring 70 is mounted on the heating wire connector 69 and embedded into an inner hole of the first fixing ring 75. The heating wire 73 is sheathed with the first cotton sheet 76 and the second cotton sheet 74 from the inside out and then disposed inside the first fixing ring 75, wherein a thickness of the first cotton sheet is larger than a thickness of the second cotton sheet. The first fixing ring 75 is sheathed with the oil-storage cotton 77, and is then disposed inside the limit cover 79 of heating wire. The limit cover 79 of heating wire is in threaded connection with the second fixing ring 66.

Figure 4B:
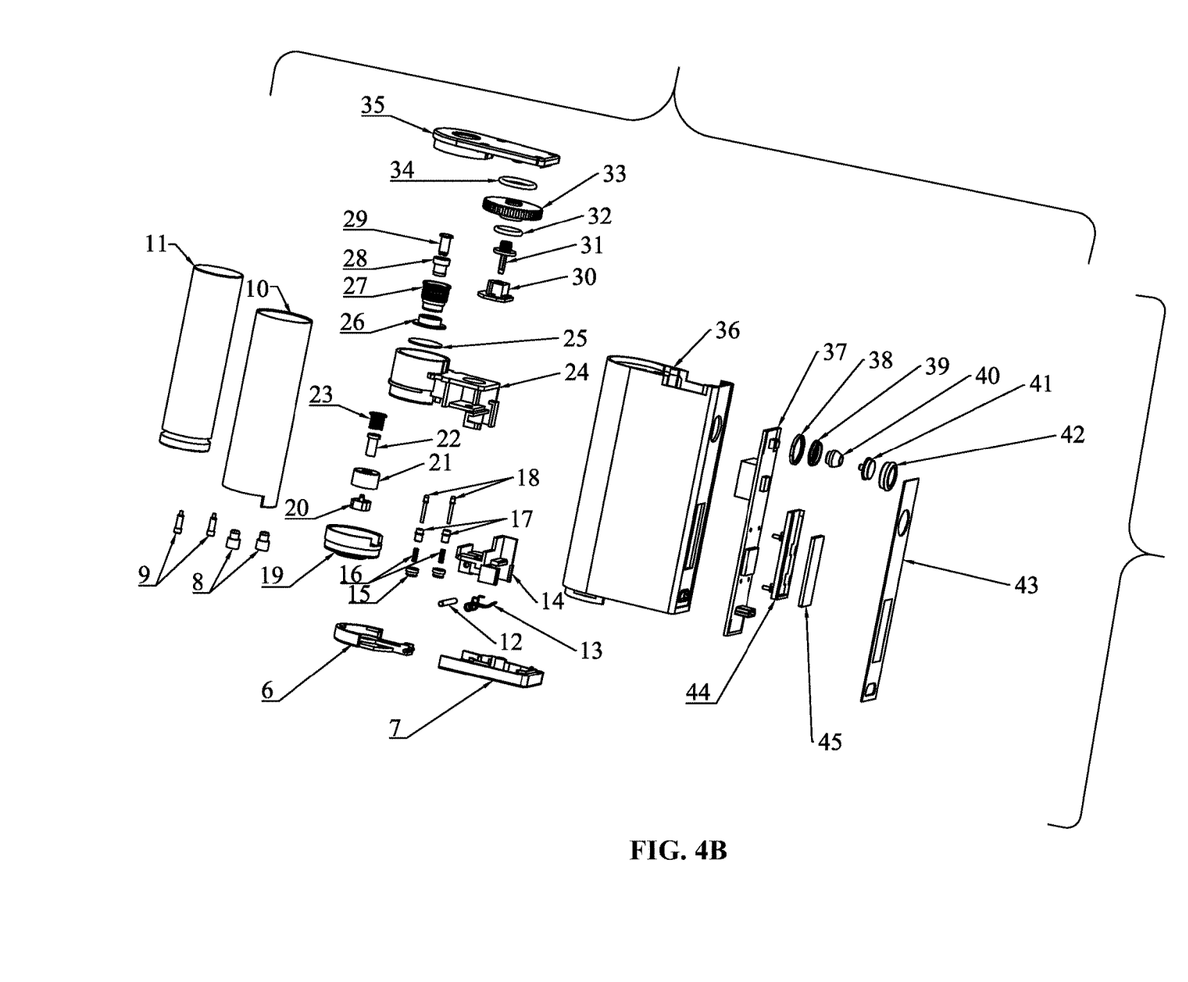
FIG. 4B is an exploded view of a battery assembly B of an electronic cigarette in accordance with one embodiment of the invention.

Preferably, the battery assembly B comprises: a battery cover 6, a lower cover 7, a third insulating ring 8 of charging contact pin, a charging contact pin 9, a second steel tube 10 configured to receive the battery, a 18650 battery 11, a spring shaft 12, a torsion spring 13, a charging column carrier 14, fourth insulating rings 15, charger springs 16, charging contact pin bases 17, a charging elastic contact pins 18, a square electrode 20, an electrode insulating cap 21, a contact pin 22 of anode, a contact pin spring 23, an adjustment rod carrier 24, an insulating spacer 25, a cathode circle of threaded ring 26, a second threaded ring 27, an output insulating ring 28, an output connector 29, an encoder 30, an adjustment rod 31, a thirteenth sealing ring beneath the adjustment wheel 32, the adjustment wheel 33, a fourteenth sealing ring above the adjustment wheel 34, an upper cover 35, a main body shell 36, and a PCB board 37. One end of the second steel tube 10 is integrated with the anode base 19. The square electrode 20, the electrode insulating cap 21, the contact pin 22, and the contact pin spring 23 are disposed on the anode base 19. The other end of the second steel tube 10 is disposed in the main body shell 36. The upper cover 35 on a top of the main body shell 36 is provided with the cathode circle of threaded ring 26, the second threaded ring 27, the output insulating ring 28, and the output connector 29 in sequence. A bottom of the main body shell 36 is provided with the lower cover 7, the battery cover 6, and the charging column carrier 14. The torsion spring 13 is integrated with the torsion spring shaft 12 and the battery cover 6, so that the battery cover 6 is rotatable around the torsion spring shaft 12 and slidable along the main body shell 36. One side of the main body shell 36 is provided with the PCB board 37, the button reinforcing ring 38, the button fixing base 39, the button rubber 40, the button 41, the decorative ring 42, the decorative sheet 43, an LCD screen 45, and a screen carrier 44.

Figure 4C:
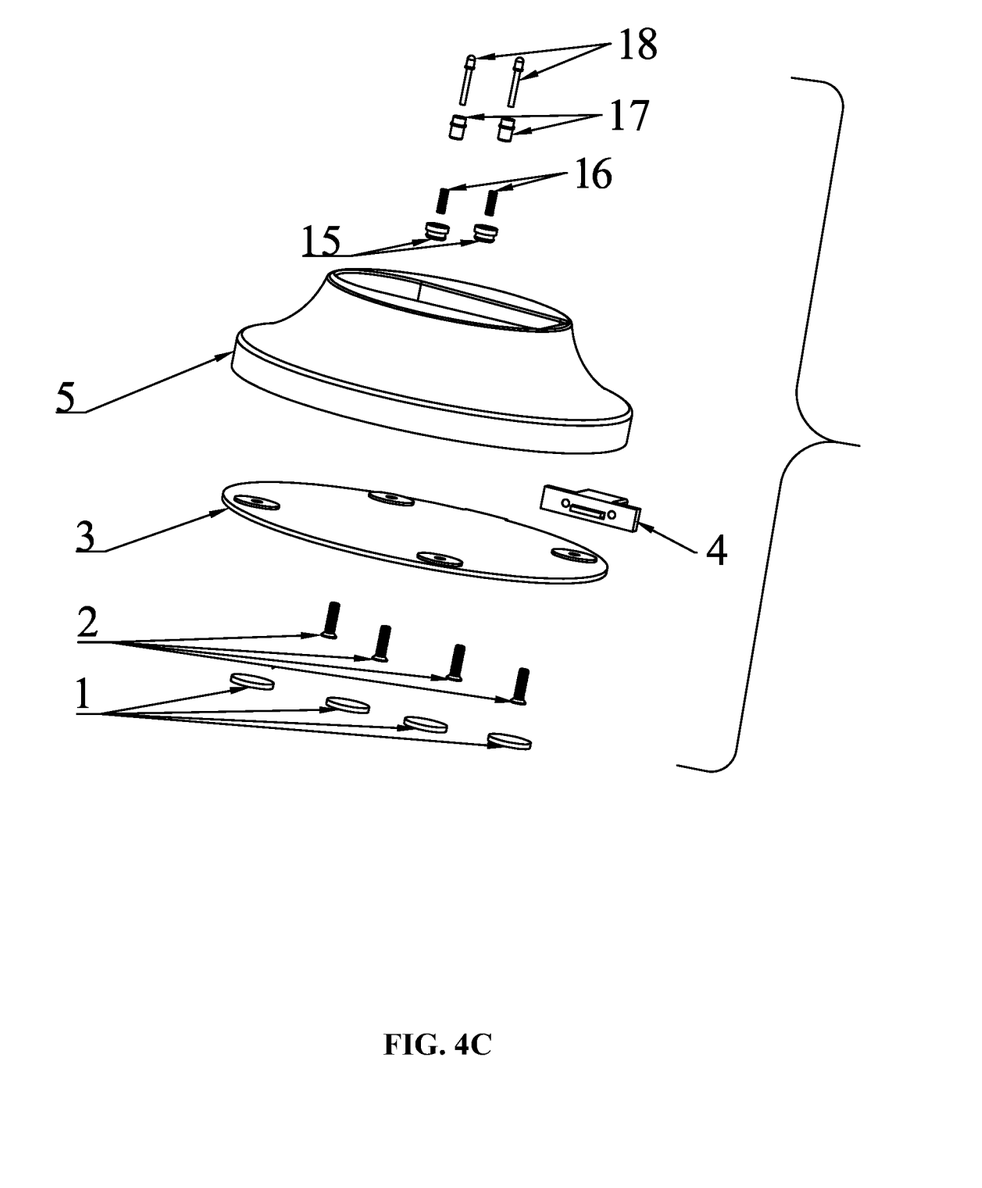
FIG. 4C is an exploded view of a charger assembly C of an electronic cigarette in accordance with one embodiment of the invention.

Preferably, the charger assembly C comprises: a charger support 1, a screw 2, a bottom cover 3, a USB charging jack 4, a charger 5, two fourth insulating rings 15 of contact pin base, two charger springs 16, two charging contact pin bases 17, and two charging elastic contact pins 18.

The charger 5 is provided with the fourth insulating rings 15, the charging elastic contact pins 18, the charging contact pin bases 17, and the charger springs 16. The charging elastic contact pins 18 are integrated with the charging contact pin bases 17 and the charger springs 16 to form two groups of members which are disposed in the charger 5 and are used as charging anode and cathode. In addition, a bottom of the charger 5 is provided with the USB charging jack 4 to supply electricity. The bottom cover 3 is provided with the charger support 1 to realize slip resistance.

Compared with conventional technologies, the advantages of the temperature controllable electronic cigarette are as follows:

1. The temperature sensing wire is disposed in the heating wire, so that the temperature parameter of the heating wire is detected and transmitted to the battery assembly which adjusts the temperature value via the adjustment button, as a result, the temperature of the atomizer assembly is controlled.

2. The integral structure of the cigarette is adapted to adjust the temperature of the atomizer.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An electronic cigarette, comprising:
   a) an atomizer assembly, the atomizer assembly comprising: a temperature sensing wire, a first steel tube configured to receive the temperature sensing wire, and a temperature sensing base;
   b) a battery assembly, the battery assembly comprising an adjustment wheel; and
   c) a charger assembly, the charger assembly comprising two elastic contact pins;
   wherein
   the atomizer assembly is in threaded connection with the battery assembly; the battery assembly is disposed on the charger assembly; the charger assembly is electrically connected to the battery assembly via the two elastic contact pins so as to charge the battery assembly; and the temperature sensing wire transmits temperature parameters to the battery assembly, and a power output is adjusted by the adjustment wheel thereby realizing temperature control.

2. The electronic cigarette of claim 1, wherein the atomizer assembly comprises: a mouthpiece cap, a mouthpiece, a first sealing ring of mouthpiece, a mouthpiece converter, a second sealing ring on the mouthpiece converter, a third sealing ring inside the converter, a fourth sealing ring outside the converter, a steel mesh, a limit cover of heating wire, a fifth sealing ring of limit cover of heating wire, a piece of oil-storage cotton, a first cotton sheet, a first fixing ring of heating wire, a second cotton sheet, a heating wire, the temperature sensing wire, the first steel tube, a first insulating ring of heating wire, a heating wire connector, the temperature sensing base, two contact pins, a sixth sealing ring outside the converter, a second fixing ring of heating wire, a seventh sealing ring of threaded ring, a threaded connecting ring, an eighth sealing ring of flow, a flow adjustment ring, a first threaded ring, a second insulating ring, an adjustment ring, a first spring, a ninth sealing ring of shaft sleeve, a pin, a tenth sealing ring of adjustment ring, an oiling base, an eleventh sealing ring of glass tube, a glass tube, a sealing ring clasp, a twelfth sealing ring of atomizing rod, a shaft sleeve, a windowed tube, an eleventh sealing ring of glass tube, and a third fixing ring of glass tube; wherein the steel mesh, the fifth sealing ring, the heating wire, and the temperature sensing wire are disposed inside the first fixing ring; the first steel tube is inserted in the temperature sensing base for fixation; the two contact pins are inserted into two holes on the temperature sensing base to fix two ends of the temperature sensing wire, respectively; the heating wire connector is integrated with the temperature sensing base, and the first insulating ring is mounted on the heating wire connector and embedded into an inner hole of the first fixing ring; the heating wire is sheathed with the first cotton sheet and the second cotton sheet from the inside out and then disposed inside the first fixing ring, wherein a thickness of the first cotton sheet is larger than a thickness of the second cotton sheet; the first fixing ring is sheathed with the oil-storage cotton, and is then disposed inside the limit cover of heating wire; and the limit cover of heating wire is in threaded connection with the second fixing ring.

3. The electronic cigarette of claim 1, wherein the battery assembly comprises: a battery cover, a lower cover, a third insulating ring of charging contact pin, a charging contact pin, a battery, a second steel tube configured to receive the battery, a torsion spring shaft, a torsion spring, a charging column carrier, fourth insulating rings, charger springs, charging contact pin bases, a charging elastic contact pins, a square electrode, an electrode insulating cap, a contact pin of anode, a contact pin spring, an anode base, an adjustment rod carrier, an insulating spacer, a cathode circle of threaded ring, a second threaded ring, an output insulating ring, an output connector, an encoder, an adjustment rod, a thirteenth sealing ring beneath the adjustment wheel, the adjustment wheel, a fourteenth sealing ring above the adjustment wheel, an upper cover, a main body shell, and a PCB board; wherein one end of the second steel tube is integrated with the anode base; the square electrode, the electrode insulating cap, the contact pin of anode, and the contact pin spring are disposed on the anode base; the other end of the second steel tube is disposed in the main body shell; the upper cover on a top of the main body shell is provided with the cathode circle of threaded ring, the second threaded ring, the output insulating ring, and the output connector in sequence; a bottom of the main body shell is provided with the lower cover, the battery cover, and the charging column carrier; the torsion spring is integrated with the torsion spring shaft and the battery cover, so that the battery cover is rotatable around the torsion spring shaft and slidable along the main body shell; one side of the main body shell is provided with the PCB board, a button reinforcing ring, a button fixing base, a button rubber, a button, a decorative ring, a decorative sheet, an LCD screen, and a screen carrier.

4. The electronic cigarette of claim 1, wherein
the charger assembly comprises: a charger support, a screw, a bottom cover, a USB charging jack, a charger, two fourth insulating rings of contact pin base, two charger springs, two charging contact pin bases, and two charging elastic contact pins; wherein
the charger is provided with the fourth insulating rings, the charging elastic contact pins, the charging contact pin bases, and the charger springs; the charging elastic contact pins are integrated with the charging contact pin bases and the charger springs to form two groups of members which are disposed in the charger and are used as charging anode and cathode; a bottom of the charger is provided with the USB charging jack to supply electricity; and the bottom cover is provided with the charger support to realize slip resistance.

5. The electronic cigarette of claim 2, wherein
the charger assembly comprises: a charger support, a screw, a bottom cover, a USB charging jack, a charger, two fourth insulating rings of contact pin base, two charger springs, two charging contact pin bases, and two charging elastic contact pins; wherein
the charger is provided with the fourth insulating rings, the charging elastic contact pins, the charging contact pin bases, and the charger springs; the charging elastic contact pins are integrated with the charging contact pin bases and the charger springs to form two groups of members which are disposed in the charger and are used as charging anode and cathode; a bottom of the charger is provided with the USB charging jack to supply electricity; and the bottom cover is provided with the charger support to realize slip resistance.

\* \* \* \* \*